United States Patent
Cho et al.

(10) Patent No.: US 8,738,994 B2
(45) Date of Patent: May 27, 2014

(54) MEMORY CONTROLLER, MEMORY SYSTEM, AND OPERATING METHOD

(75) Inventors: Hyun Duk Cho, Hwaseong-si (KR); Yun-A Son, Seoul (KR); Chang Il Son, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 204 days.

(21) Appl. No.: 13/454,301

(22) Filed: Apr. 24, 2012

(65) Prior Publication Data

US 2012/0272114 A1    Oct. 25, 2012

Related U.S. Application Data

(60) Provisional application No. 61/478,576, filed on Apr. 25, 2011.

(51) Int. Cl.
*G11C 29/00* (2006.01)

(52) U.S. Cl.
USPC .......................................... 714/763; 714/748

(58) Field of Classification Search
USPC ........... 360/53; 714/2, 45, 718, 764, 763, 748
See application file for complete search history.

(56) References Cited

U.S. PATENT DOCUMENTS

| | | | | |
|---|---|---|---|---|
| 4,549,296 A | * | 10/1985 | Castel et al. | 714/45 |
| 6,061,805 A | | 5/2000 | Suzuki et al. | |
| 6,084,733 A | * | 7/2000 | Ohzeki et al. | 360/53 |
| 6,118,608 A | * | 9/2000 | Kakihara et al. | 360/53 |
| 6,345,366 B1 | * | 2/2002 | Asano et al. | 714/2 |
| 6,530,034 B1 | * | 3/2003 | Okada et al. | 714/5.11 |
| 7,444,462 B2 | | 10/2008 | Traister et al. | |
| 8,117,491 B2 | * | 2/2012 | Nishimiya | 714/6.11 |
| 2008/0301288 A1 | | 12/2008 | Bychkov et al. | |

FOREIGN PATENT DOCUMENTS

| | | |
|---|---|---|
| JP | 1995220033 | 8/1995 |
| JP | 1998161818 | 6/1998 |

* cited by examiner

*Primary Examiner* — David Ton
(74) *Attorney, Agent, or Firm* — Volentine & Whitt, PLLC

(57) ABSTRACT

A memory controller and method of operating same are described. The memory controller includes a central processing unit providing re-transmission control signal, an error check block determining whether an error exists in data received from a host and generating a corresponding error check signal, and a re-transmission request unit receiving the control signal and the error check signal, communicating a request to the host for an error-correcting re-transmission operation when an error exists in the received data, and communicating a request for an extending re-transmission operation when error does not exist in the received data.

20 Claims, 18 Drawing Sheets

FIG. 5A

| RT_SEL | OUTPUT SIGNAL OF SELECTOR 115 | REQUEST/ NON-REQUEST OF RETRANSMISSION |
|---|---|---|
| 1 | CRC_F | REQUEST RETRANSMISSION |
| 0 | CRC_R | REQUEST RETRANSMISSION WHEN CRC_R=1 NO REQUEST RETRANSMISSION WHEN CRC_R=0 |

FIG. 5B

| RT_DAT | OUTPUT SIGNAL OF SELECTOR 117 | DATA VALIDITY/ INVALIDITY |
|---|---|---|
| 1 | CRC_F | RECEIVED DATA : VALID |
| 0 | CRC_R | RECEIVED DATA IS INVALID WHEN CRC_R=1 RECEIVED DATA IS INVALID WHEN CRC_R=0 |

FIG. 7A

| RT_SEL | OUTPUT SIGNAL OF SELECTOR 115 | REQUEST/ NON-REQUEST OF RETRANSMISSION |
|---|---|---|
| 1 | CRC_F | REQUEST RETRANSMISSION |
| 0 | CRC_R WHEN DM_DAT=0 CRC_P WHEN DM_DAT=1 | |

FIG. 7B

| DM_DAT | OUTPUT SIGNAL OF SELECTOR 118 | DATA VALIDITY/ INVALIDITY |
|---|---|---|
| 1 | DUMMY DATA | INVALID (DISCARD) |
| 0 | RECEIVED DATA | VALID |

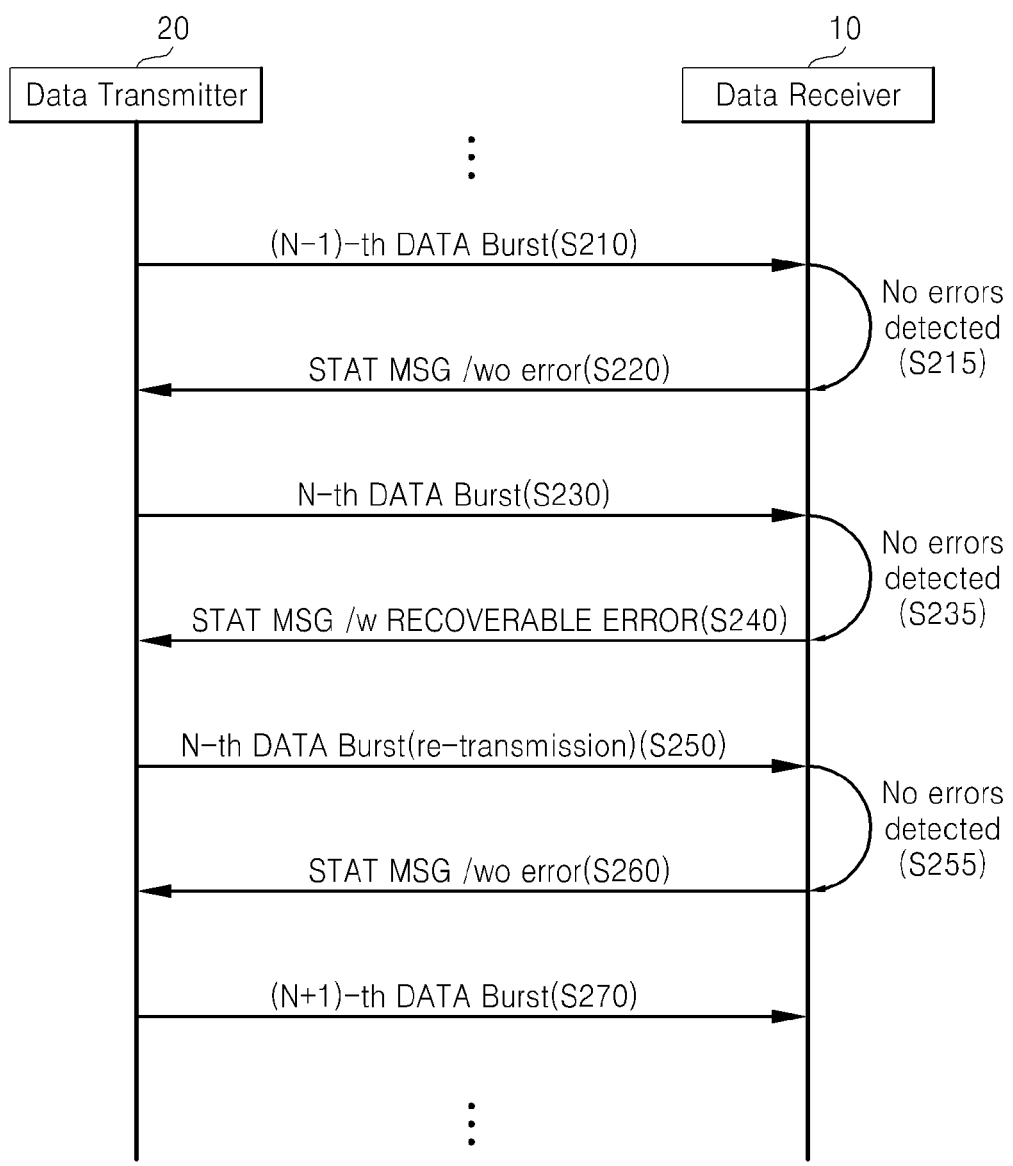

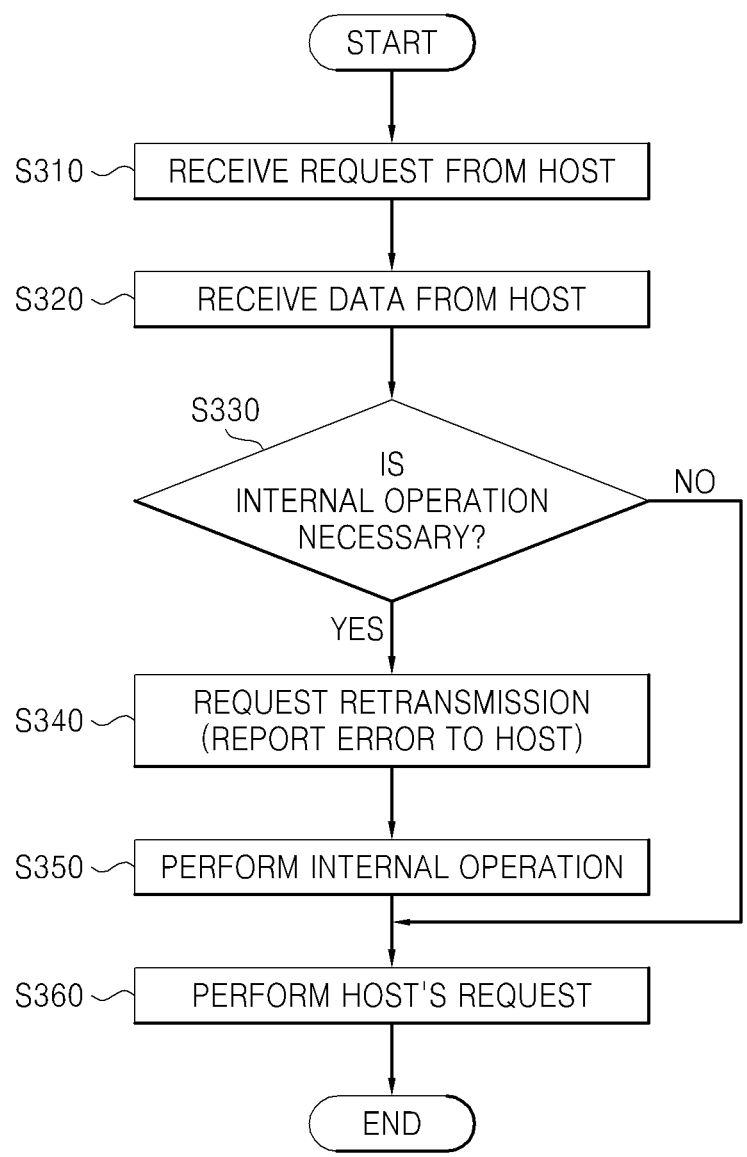

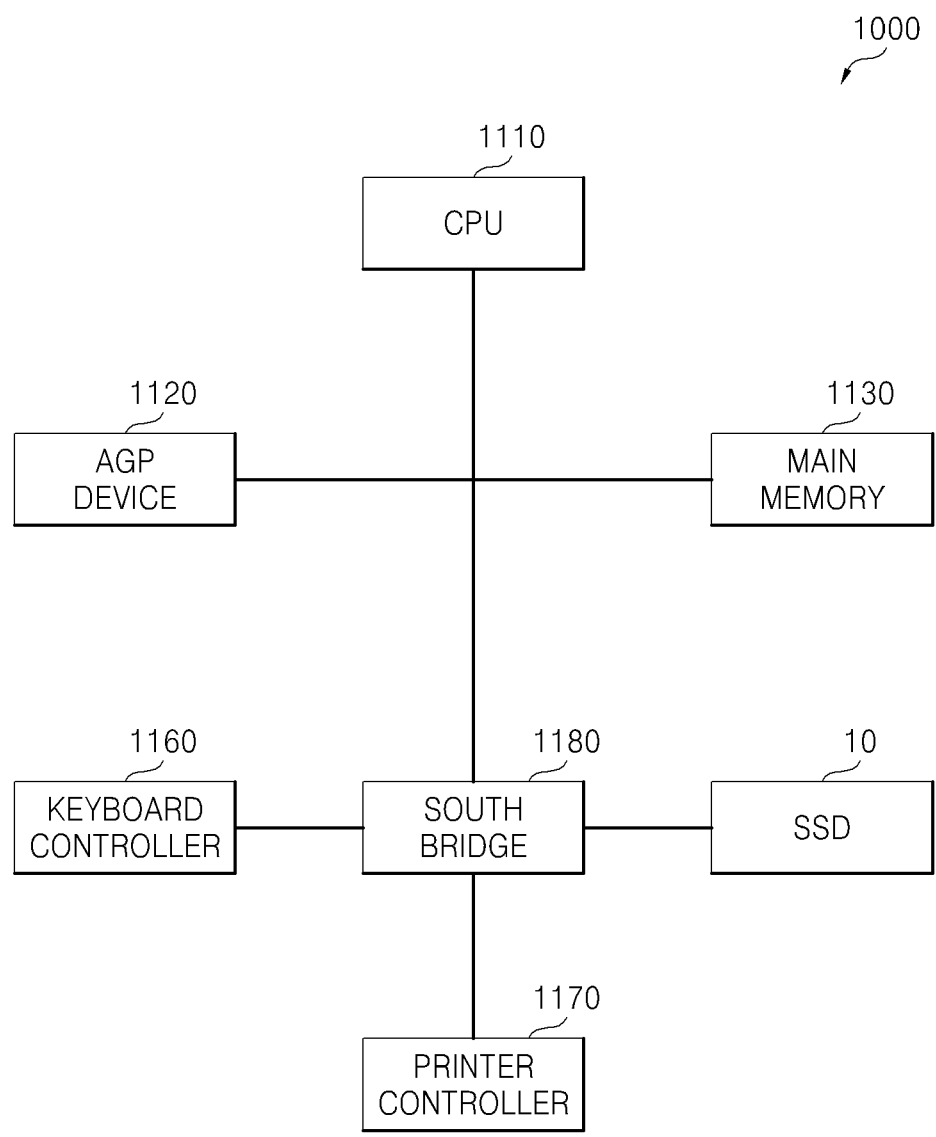

MEMORY CONTROLLER, MEMORY SYSTEM, AND OPERATING METHOD

CROSS-REFERENCE TO RELATED APPLICATIONS

This application claims priority under 35 U.S.C. §119(a) from U.S. Provisional Patent Application No. 61/478,576 filed Apr. 25, 2011, the subject matter of which is hereby incorporated by reference.

BACKGROUND OF THE INVENTION

The inventive concept relates to memory controller, memory systems, and methods of operating same. More particularly, the inventive concept relates to non-volatile memory controllers, non-volatile memory systems, and operating methods for same.

Non-volatile memory, such as flash memory, has become a staple component in many different types of contemporary electronics and digital computational systems. Non-volatile memory is operatively associated with a "host" that controls the exchange of data to/from the non-volatile memory and/or the execution of various operations by the non-volatile memory. The generic combination of non-volatile memory with a memory controller may be termed a "memory system". Memory systems may then in turn be operatively combined with a host in different systems. There are many different types of memory systems, such as the so-called solid state drive (SSD), various memory cards (e.g., secure digital (SD) cards and multimedia cards (MMCs), etc.

In a memory system configured with flash memory, the size of data processed by an associated host is often different from the size of a data (e.g., page data) processed in the flash memory. This difference must be accounted for during read and write (or program) operations. For example, during a write operation in a SD card or MMC, the host may send burst data of 512 bytes to the memory system during respective data transfer periods (a "busy period"). Each busy period may be limited to no more than 250 msec. Despite the duration of the busy period defined by the host, the constituent flash memory of the SD card or MMC may programmed according to a defined data page size (e.g., 2, 4 or 8 KB per pages). Hence, since the size of the page data, as processed by the flash memory, is different from the size of data transferred during a busy period, busy periods will not be uniformly distributed but will occur in clusters during a given time period.

In addition, when certain long-duration, data processing events, such as a merge operation, are required, the corresponding busy period may increase. Accordingly, various approaches have been introduced that seek to avoid busy period "time-outs" that would otherwise occur due to mismatches between host-defined busy period durations and memory system operation periods. However, there remains no real fundamental approach to effectively extending busy period(s) for many hosts, and conventional memory systems are left with no other option but to manipulate (combine or divide) available busy periods in order to perform necessary operations.

SUMMARY

Certain embodiments of the inventive concept provide a memory controller and memory system capable of avoiding busy period time-out by securing a sufficiently long busy period for the processing of data received from a host. Other embodiments of the inventive concept provide an operating method for this type of memory controller and memory system.

According to certain embodiments of the inventive concept, there is provided a memory controller for controlling a non-volatile memory device. The memory controller includes a central processing unit that provides a re-transmission control signal, an error check block that determines whether an error exists in data received from a host and generates a corresponding error check signal, and a re-transmission request unit receiving the control signal and the error check signal, configured to communicate a request to the host for an error-correcting re-transmission operation when it is determined that an error exists in the received data as indicated by the error check signal, and further configured to communicate to the host a request for an extending re-transmission operation when it has been determined that an error does not exist in the received data and in response to the re-transmission control signal.

According to other embodiments of the inventive concept, there is provided a method of operating a memory controller that controls a non-volatile memory device, the comprising; receiving data from a host and determining whether or not the received data includes an error, upon determining that the received data includes an error, requesting an error-correcting re-transmission operation for the received data, and before performing an internal operation by the non-volatile memory, requesting an extending re-transmission operation for the received data after determining that the received data does not include an error and after storing the received data in a memory buffer.

BRIEF DESCRIPTION OF THE DRAWINGS

The above and other features and advantages of the inventive concept will become more apparent by describing in detail exemplary embodiments thereof with reference to the attached drawings in which:

FIGS. 5A and 5B are tables explaining possible operations for the host interface of FIG. 4;

FIGS. 7A and 7B are tables explaining possible operations for the host interface of FIG. 6;

FIG. 9 is a flowchart summarizing an operating method for a memory system according to certain embodiments of the inventive concept;

FIG. 11 is a flowchart summarizing an operating method for a memory controller according to embodiments of the inventive concept;

FIG. 14 shows a block diagram of a computer system including a memory system according to an embodiment of the inventive concept.

DETAILED DESCRIPTION OF THE EMBODIMENTS

Embodiments of the inventive concept now will be described in some additional detail with reference to the accompanying drawings. The inventive concept may, however, be embodied in many different forms and should not be construed as limited to only the illustrated embodiments. Rather, the illustrated embodiments are provided so that this disclosure will be thorough and complete, and will fully convey the scope of the inventive concept to those skilled in the art. Throughout the written description and drawings, like reference numbers and labels denote like or similar elements and/or features.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1:
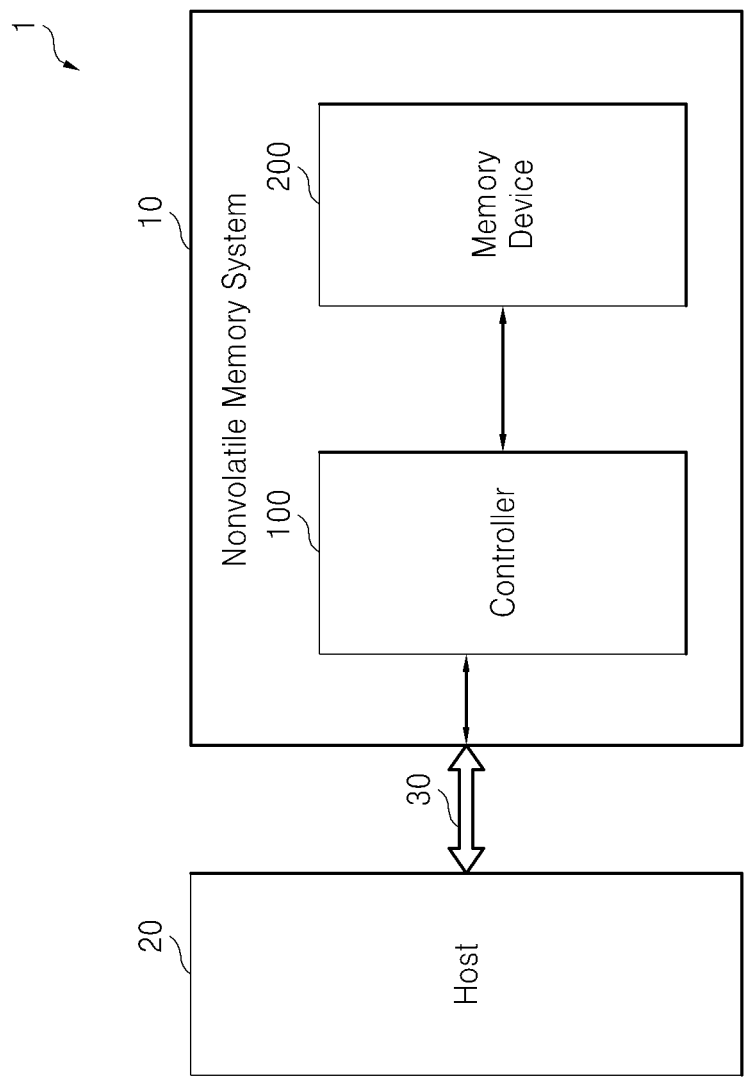
FIG. 1 is a schematic block diagram of a non-volatile memory system according to some embodiments of the inventive concept.

FIG. 1 is a general schematic block diagram of a non-volatile memory system 10 according to certain embodiments of the inventive concept that is capable of operating in relation to a host 20. The non-volatile memory system 10 comprises a memory controller 100 and a non-volatile memory device 200.

The non-volatile memory system 10 may be a solid state drive (SSD), a multimedia card (MMC), an embedded MMC (eMMC), or a secure digital (SD) card, but is not restricted thereto. The non-volatile memory device 200 may be a flash memory device but is not restricted thereto. It may be a phase-change random access memory (PRAM), a magnetic RAM (MRAM), a resistive RAM (ReRAM), or a ferroelectric RAM (FeRAM). When the non-volatile memory device 200 is a flash memory device, it may be a floating gate NAND flash memory device or a charge trap flash (CTF)-based NAND flash memory device. Memory cell transistors may be arranged in two or three dimensions in the non-volatile memory device 200.

The memory controller 100 controls the overall operation of the non-volatile memory system 10 and controls data exchanges between the host 20 and the non-volatile memory device 200. For instance, the memory controller 100 controls the non-volatile memory device 200 in response to a write request (or command) or a read request received from the host 20. The memory controller 100 also controls one or more "internal operations" (e.g., performance adjustment, merge, and wear leveling operations) that are necessary to the efficient management and operation of the memory device 200. Those skilled in the art will understand that a variety of internal operations will be necessary or desirable to define and maintain the operating characteristics of the non-volatile memory system 10. In order to perform an internal operation, the memory controller 100 may send a phantom (e.g., some form of recoverable) error message to the host 20 despite the fact that no real data error has occurred. This particular approach will be described later.

In addition to storing host defined data in a non-volatile manner, the non-volatile memory device 200 may also be used to store an operating system (OS), various applications and programs, as well as various types of data associated with same.

Figure 2:
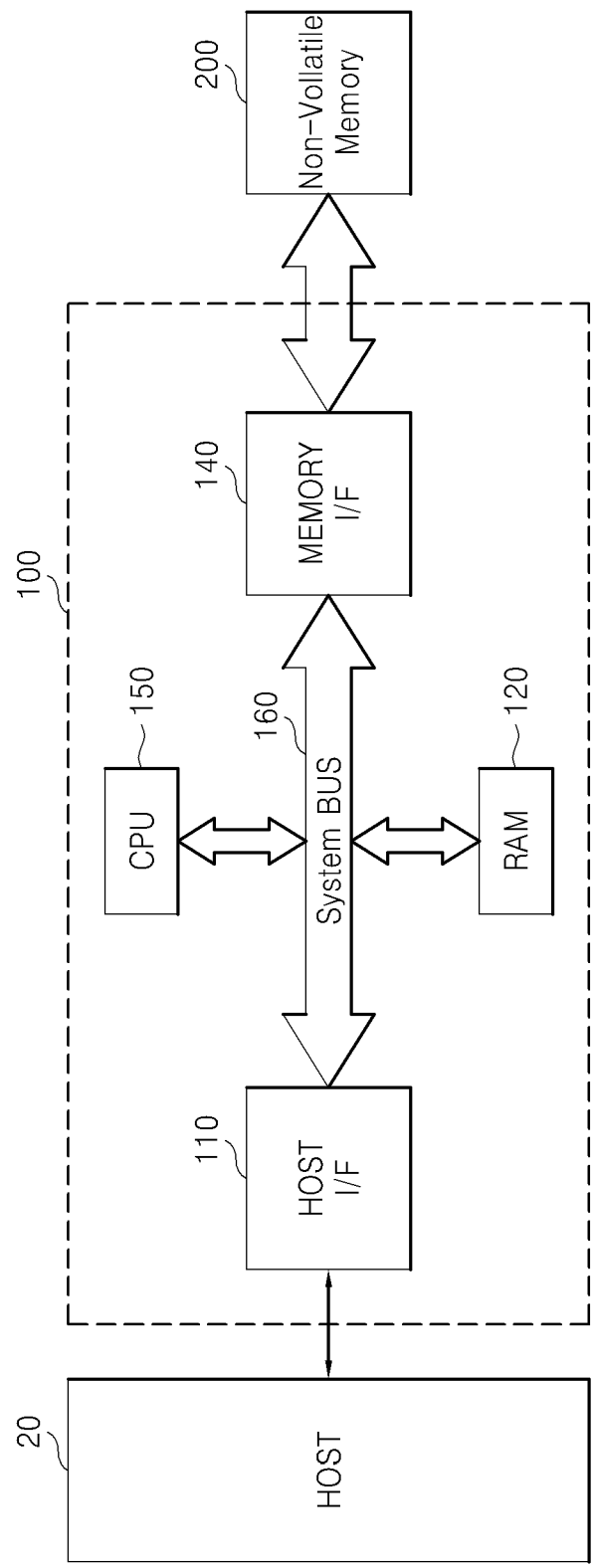
FIG. 2 is a block diagram further illustrating the memory controller of FIG. 1.

FIG. 2 is a block diagram further illustrating in one embodiment the memory controller 100 of FIG. 1.

Referring to FIG. 2, the memory controller 100 comprises a host interface 110, a memory 120, a memory interface 140, a central processing unit (CPU) 150, and a bus 160.

The host interface 110 facilitates an interface protocol used to communicate with the host 20. The interface protocol may be an ultra-high speed (UHS)-I protocol, a UHS-II protocol, a peripheral component interconnect-express (PCI-E) protocol, an advanced technology attachment (ATA) protocol, a serial ATA (SATA) protocol, a parallel ATA (PATA) protocol, and/or a serial attached SCSI (SAS) protocol or other type(s) of, interface protocols such as a universal serial bus (USB) protocol, an MMC protocol, an enhanced small disk interface (ESDI) protocol, and an integrated drive electronics (IDE) protocol.

The memory 120 may be a volatile memory, such as a static RAM (SRAM) and/or a dynamic RAM (DRAM). The memory 120 functions as a buffer that temporarily stores 'write data" to be stored in the non-volatile memory device 200 during a write operation and "read data' obtained from the non-volatile memory device 200 during a read operation. In certain embodiments, the memory 120 may be embedded in the memory controller 100, and/or may be provided external to the memory controller 100.

The memory interface 140 facilitates data exchanges between the memory controller 100 and the non-volatile memory device 200. The CPU 150 controls the overall operation of the non-volatile memory device 200 during various operations, such as read/write operations.

Although not shown, the non-volatile memory system 10 may include additional components, such as a read-only memory (ROM) capable of storing code data that is executed upon power-up of the non-volatile memory system 10, an error correction code (ECC) engine capable of generating ECC data stored in the non-volatile memory device 200 in conjunction with "payload" data and decodes read data obtained from the non-volatile memory device 200.

Figure 3:
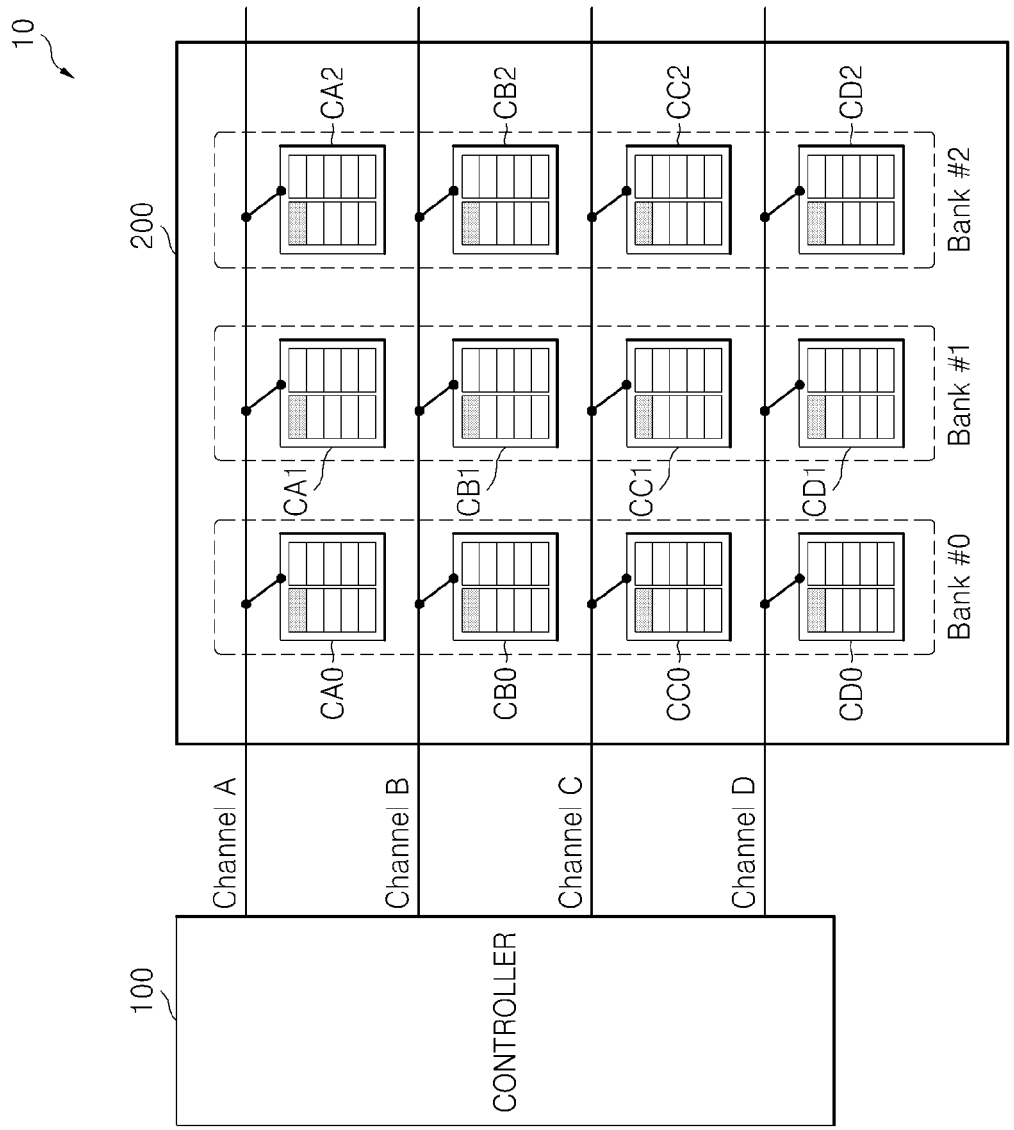
FIG. 3 is a schematic diagram further illustrating one possible structure for the non-volatile memory device of FIG. 1.

FIG. 3 is a schematic diagram further illustrating one possible structure for the non-volatile memory device 200 of FIGS. 1 and 2. Referring to FIG. 3, the non-volatile memory device 200 comprises a plurality of memory elements. For example, FIG. 3 shows one possible embodiment in which the non-volatile memory device 200 comprises a 4-channel, 3-bank structure but the inventive concept is not restricted to only this embodiment. Each bank illustrated in FIG. 3 may be implemented as a flash memory chip, but again, the inventive concept is not restricted thereto.

In the non-volatile memory system 10 of FIG. 3, the memory controller 100 and the non-volatile memory device 200 are connected via four channels A, B, C, and D. Three flash memory elements CA0 through CA2, CB0 through CB2, CC0 through CC2, or CD0 through CD2 are connected to a corresponding one of the channels A, B, C, and D. However, those skilled in the art will recognize that any reasonable number and/or arrangement of channels and banks may be used in other embodiments of the inventive concept.

Figure 4:
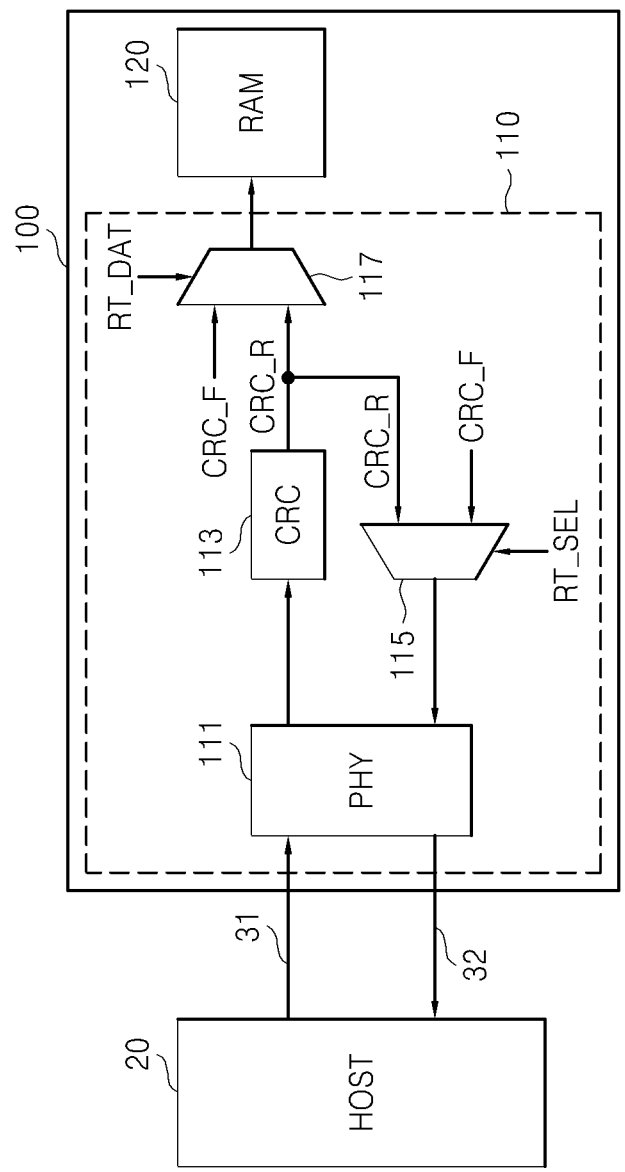
FIG. 4 is a block diagram further illustrating the host interface of FIG. 2 according to certain embodiments of the inventive concept.

FIG. 4 is a block diagram further illustrating in one embodiment of the inventive concept the host interface 110 of FIG. 2. FIGS. 5A and 5B are tables referencing certain exemplary control signals that may be used in conjunction with the host interface 110 of FIG. 4. Referring to FIG. 4 and FIGS. 5A and 5B, one embodiment of the host interface 110 comprises a physical interface block 111 and an error check block 113. The memory controller 100 may also include a register (not shown) and a counter (not shown).

The physical interface block 111 receives data from the host 20 and communicates the data to the error check block 113. The error check block 113 checks whether or not an error is present in the data received from the host 20 and then outputs a corresponding error check signal (CRC_R). In certain embodiments, the error check block 113 may be a cyclic redundancy check (CRC) module that is capable of determining whether an error is present in the received data using a conventionally understood CRC routine. The error check block 113 may also be used to detect a frame error as well as a CRC error.

The received data may be temporarily stored in a data buffer 120 via the error check block 113. The data buffer 120 may correspond to the memory 120 illustrated in FIG. 2.

When an error is detected in the received data, the error check block 113 sends "error information" to the physical interface block 111 so that the physical interface block 111 may request a re-transmission of the errant data by the host 20. In the illustrated embodiment of FIGS. 4, 5A and 5B, even when no error has been detected in the received data, a re-transmission of the data may be requested in order to secure another busy period associated with the re-transmission operation. A decision on whether (or when) to request a re-transmission of "current data" (i.e., data recently received by the memory system 10 from the host 20) when no errors have been detected in the current data may be made by the CPU 150 of the memory controller 100. For example, when an event, such as a merge operation, requiring a considerable period of execution time occurs, the firmware of the memory controller 100 may make a determination that requests a corresponding re-transmission of current data even when no error has been detected in the current data. This type of re-transmission operation may be termed an "extending re-transmission operation" and is distinguished from a "error-correcting re-transmission operation" following detection of an error in the current data.

In the illustrated embodiment of FIG. 4, the host interface 110 comprises a re-transmission request unit embodied by a first selector 115 and a second selector 117 that may be used to request an extending re-transmission operation, as well as an error-correcting re-transmission operation for the current data.

The first selector 115 selectively outputs either the error check signal CRC_R or a defined fail signal CRC_F in response to one or more "re-transmission control signal(s)", here, a re-transmission selection signal RT_SEL. The physical interface block 111 may then request the host 20 to retransmit current data in response to the output signal of the first selector 115. The re-transmission selection signal RT_SEL is a signal that indicates a re-transmission request.

The operation of the host interface 110 will be described in some additional detail with reference to the table shown in FIG. 5A. In the illustrated example, the first selector 115 selects and outputs the error check signal CRC_R when the re-transmission selection signal RT_SEL is "0" and the fail signal CRC_F when the re-transmission selection signal RT_SEL is "1". Accordingly, when the re-transmission selection signal RT_SEL is "1", the fail signal CRC_F is selected, and therefore, the physical interface block 111 requests data re-transmission. A re-transmission request may be delivered to the host 20 using, for example, a status message.

The physical interface block 111 may send the status message to the host 20 whenever burst data (e.g., one particular form of current data) having a predetermined size is received from the host 20. The status message may as simple as an error flag contained in the status message. However provided, the status message indicates whether or not an error has been detected in the received burst data. Once the host 20 receives a status message indicating a re-transmission request from the memory system 10, it may retransmit the burst data previously sent to the memory system 10.

When the re-transmission selection signal RT_SEL is "0", the error flag of the status message will be set according to the value of the error check signal CRC_R. That is, in the absence of a re-transmission selection signal indicating a need for an extending re-transmission operation, the determination as to whether or not a conventional error-correcting re-transmission operation is required will be indicated by the error check signal CRC_R. Hence, when the error check signal CRC_R is "1", that is, when there is an error has been detected in the current data, the error flag of the status message may be set to "1" and the host 20 will, accordingly, perform a re-transmission of the current data. However, when the error check signal CRC_R is "0", that is, when no error has been detected in the current data, the error flag of the status message is set to "0" and no re-transmission operation of any kind is performed.

The operation of the host interface 110 will be further described with reference to the table shown in FIG. 5B. The second selector 117 selectively outputs either the error check signal CRC_R or the fail signal CRC_F to the data buffer 120 in response to a re-transmission data signal RT_DAT. For instance, the second selector 117 may be used to select and outputs the error check signal CRC_R when the re-transmission data signal RT_DAT is "0" and the fail signal CRC_F when the re-transmission data signal RT_DAT is "1".

As previously noted, the data received from the host 20 may be stored as current data in the data buffer 120. Accordingly, the current data stored in the data buffer 120 may be selectively discarded (or retained) in response to the output signal of the second selector 117.

The re-transmission data signal RT_DAT is a signal which indicates whether or not to discard the current data stored in the data buffer 120. When the fail signal CRC_F is selected, the current data stored in the data buffer 120 is deemed valid, is not discarded, and may subsequently be programmed to the non-volatile memory device 200. Alternately, when the error check signal CRC_R is selected, the determination as to whether the current data stored in the data buffer 120 is valid is controlled by the state of the error check signal CRC_R. When the error check signal CRC_R is "1", that is, when an error has been detected in the current data, the current data is deemed invalid and may be discarded. However, when the error check signal CRC_R is "0", that is, where no error has been detected in the current data, the current data stored in the data buffer 120 is deemed valid, is not discarded, and may subsequently be programmed to the non-volatile memory device 200.

In certain embodiments of the inventive concept, the control logic state of the re-transmission selection signal RT_SEL and the re-transmission data signal RT_DAT may be set by the CPU 150 according to defined conditions indicating a need for (1) no re-transmission operation; (2) an extending re-transmission operation, or (3) an error-correcting re-transmission operation. Various needs for an error-correcting re-transmission operation will vary by memory system design and will be understood by those skilled in the art. The simple CRC error detection and correction routine referenced above is but one example. Various needs for an extending re-transmission operation will also vary be memory system design and as suggested above may relate to the execution of certain internal operations having lengthy execution periods—perhaps longer than the busy period(s) defined by the host 20.

Figure 6:
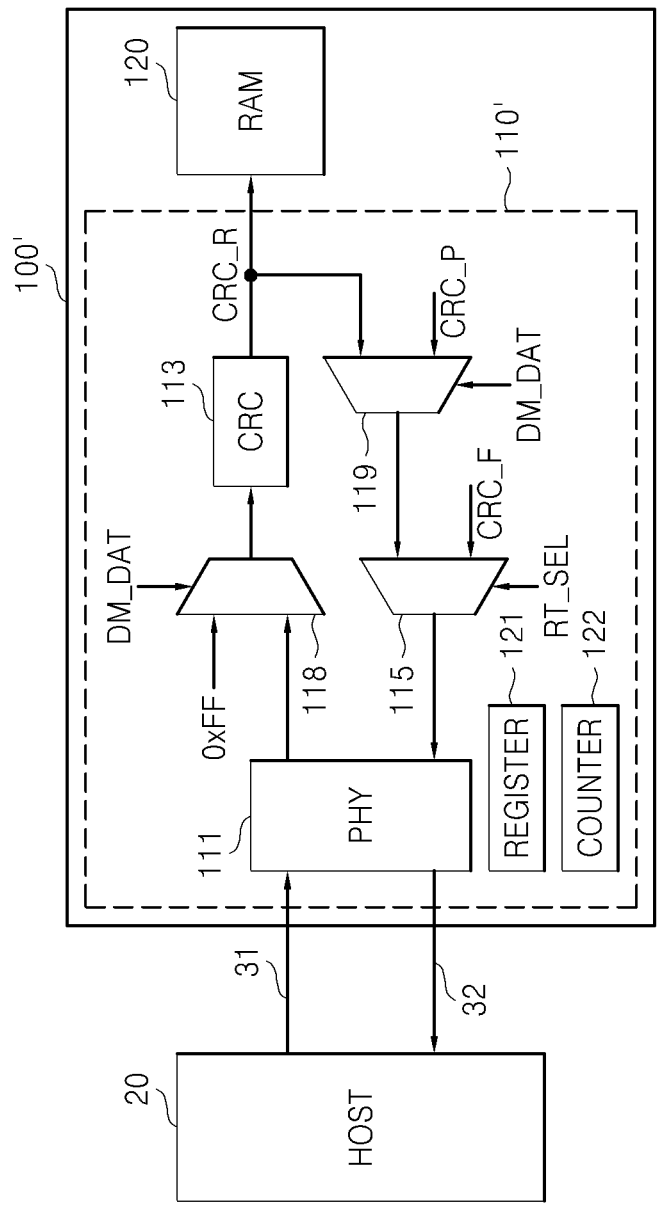
FIG. 6 is a block diagram further illustrating the host interface of FIG. 2 according to embodiments of the inventive concept.

FIG. 6 is a block diagram further illustrating in another embodiment of the inventive concept the host interface 110' of FIG. 2. FIGS. 7A and 7B are tables further illustrating one possible mode of operation for the host interface 110' of FIG. 6. Referring collectively to FIG. 6 and FIGS. 7A and 7B, the host interface 110' again comprises the physical interface block 111, and the error check block 113, and the first selector 115. However, the host interface 110' of FIG. 6 also comprises a second selector 118 and a third selector 119.

The second selector 118 selectively outputs either current data received from the host 20 or null data to the error check block 113 in response to a dummy data signal DM_DAT. The dummy data signal DM_DAT indicates whether or not the current data is valid.

For instance, the second selector 118 selects and outputs the current data to the error check block 113 when the dummy data signal DM_DAT is "0" and selects and outputs the null data (or dummy data) to the error check block 113 when the dummy data signal DM_DAT is "1". Here, the null data is not data that is actually received from the host 20 but may be any fixed data having a predetermined value or pattern (e.g., 0xFF). Accordingly, only when the dummy data signal DM_DAT is "0" will the data received from the host 20 be applied to the error check block 113 to be checked for errors, and then stored in the data buffer 120 as current data. However, when the dummy data signal DM_DAT is "1", the received data is not passed to the error check block 113, but is essentially discarded without the overhead of storing it in the data buffer 120.

The third selector 119 selectively outputs either the error check signal CRC_R or a CRC pass signal CRC_P in response to the dummy data signal DM_DAT. For instance, the second selector 119 selects and outputs the error check signal CRC_R when the dummy data signal DM_DAT is "0" and selects and outputs the CRC pass signal CRC_P when the dummy data signal DM_DAT is "1".

The first selector 115 selectively outputs either the output signal provided by the second selector 119 or the fail signal CRC_F in response to the re-transmission selection signal RT_SEL. For example, the first selector 115 selects and outputs the output signal of the second selector 119 when the re-transmission selection signal RT_SEL is "0" and selects and outputs the fail signal CRC_F when the re-transmission selection signal RT_SEL is "1". Accordingly, the physical interface block 111 may be controlled to request re-transmission of the received data.

When the re-transmission selection signal RT_SEL is "0", the determination of whether or not to make a re-transmission request will be controlled by the dummy data signal DM_DAT. When the dummy data signal DM_DAT is "0", the determination of whether or not to request re-transmission is controlled by the error check signal CRC_R. When the dummy data signal DM_DAT is "1", the CRC pass signal CRC_P is selected and a re-transmission operation is not requested.

Here again, the re-transmission selection signal RT_SEL and the dummy data signal DM_DAT may be set by the CPU 150 according to conditions indicating no need for a re-transmission operation, the need for an extending re-transmission operation, or the need for an error-correcting re-transmission operation.

The memory controller 100' illustrated in FIG. 6 also includes a register 121 and a counter 122. The register 121 may be used to store a maximum re-transmission request count which is a predetermined maximum number of re-transmission requests and count the number of re-transmission requests. Accordingly, the counter 122 may be initialized to 0 and increased by 1 every time a re-transmission request is made. The number of re-transmission requests counted by the counter, i.e., the count result may be compared with the maximum re-transmission request count stored in the register. Re-transmission may not be requested when the count result of the counter is greater than the maximum re-transmission request count and may be requested only when the count result is less than or equal to the maximum re-transmission request count.

Figure 8:
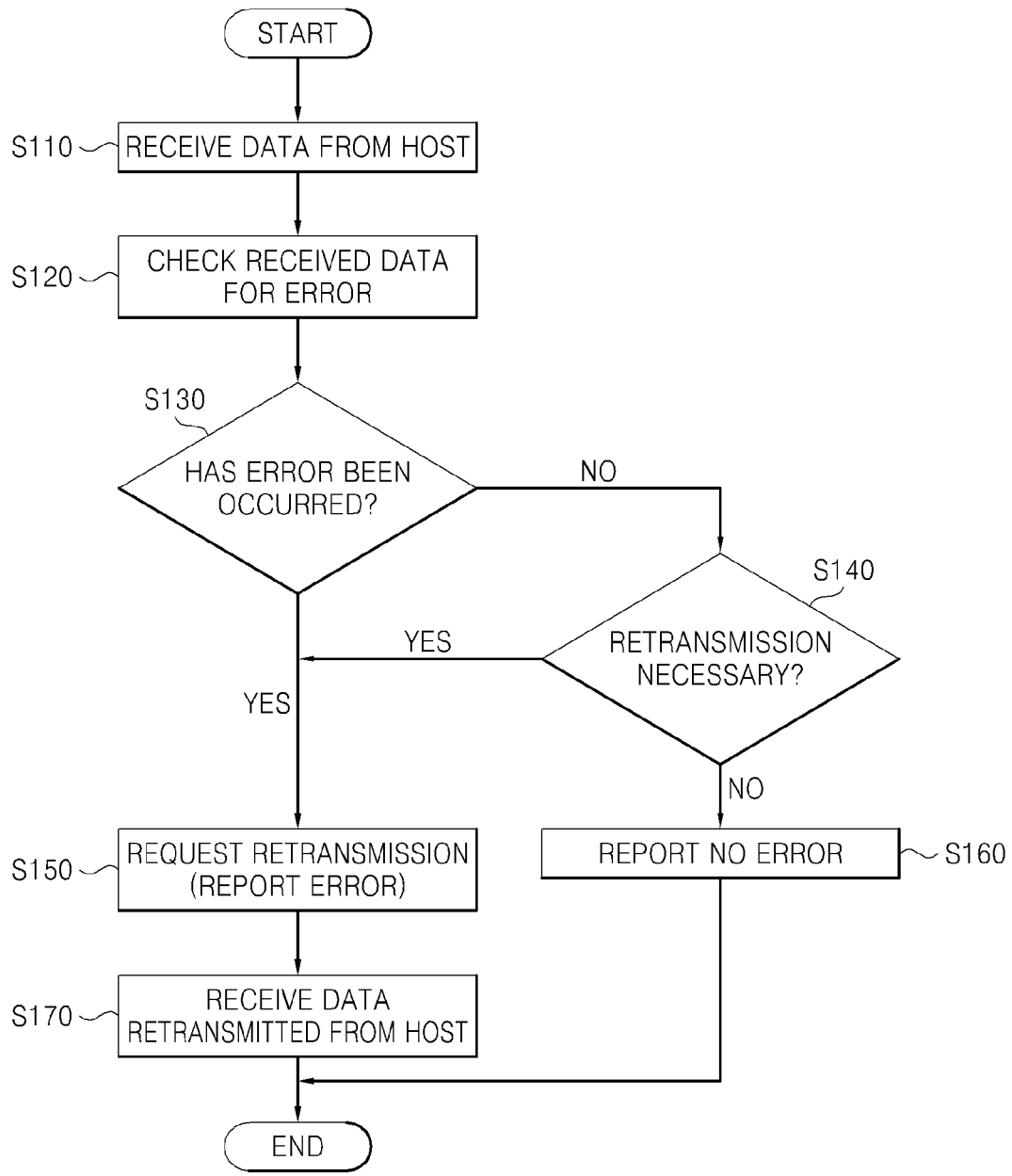
FIG. 8 is a flowchart summarizing an operating method of a memory controller according to embodiments of the inventive concept.

FIG. 8 is a flowchart summarizing one possible operating method for a memory controller and memory system according to certain embodiments of the inventive concept.

The memory controller 100 receives data (e.g., burst data) from the host 20 (S110) and checks whether the received data includes one or more error(s) (S120). When an error has occurred in the received data (S130=YES), the memory controller 100 reports the error occurrence to the host 20 and requests re-transmission of the data (i.e., an error-correcting re-transmission) (S150). However, when no error has occurred (S130=NO), the memory controller 100 next determines whether a re-transmission of the data (i.e., an extending re-transmission) is necessary (S140). When it is determined that the re-transmission of the data is necessary (S140=YES), the memory controller 100 may then report the error the host 20 and request the host 20 retransmit the data (S150). However, when it is determined that the re-transmission of the data is not necessary (S140=NO), the memory controller 100 reports no error (S160).

The reporting to the host 20 of the occurrence or non-occurrence of an error may be performed by setting the error flag of the status message as described above.

Figure 10A:
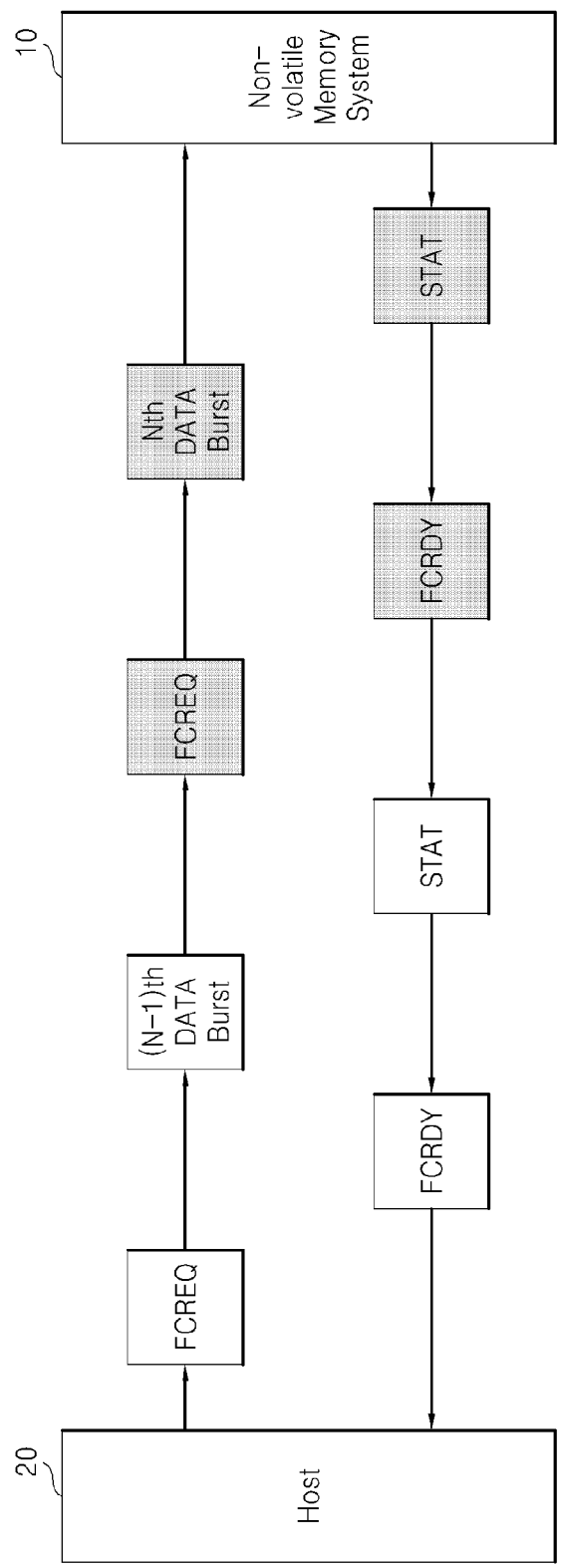
FIGS. 10A and 10B are diagrams further explaining the operating method illustrated in FIG. 9.
Figure 10B:
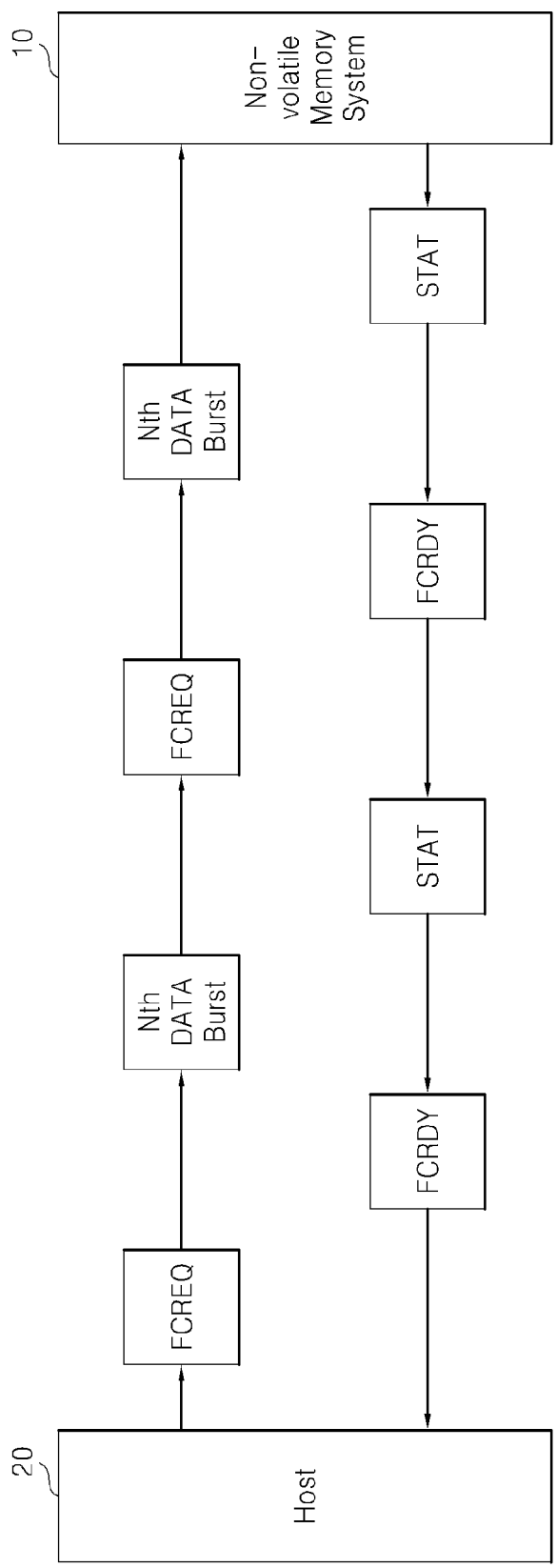

FIGS. 9, 10A and 10B are functional flowchart and component diagrams illustrating an operating method for a memory system according to certain embodiments of the inventive concept. In relation to the flowchart of FIG. 9, FIG. 10A is a diagram illustrating operations performed when no error has been detected in received data, and therefore, no re-transmission operation is requested. In relation to the flowchart of FIG. 9, FIG. 10B is a diagram illustrating operations performed when there an error is detected requiring an error-correcting re-transmission or an extending re-transmission is required to avoid a busy period time-out. The method illustrated in FIG. 9 assumes various functions associated with a data transmitter in the host 20 and a data receiver in the memory system 10.

Referring collectively to FIGS. 9, 10A and 10B, the host 20 transmits (N–1)-th burst data to the data receiver of the memory system 10 (S210). Before the host 20 transmits burst data to the memory system 10, the host 20 sends a status request message FCREQ to the memory system 10 to check whether the memory system 10 is ready to receive the burst data. In response to the status request message FCREQ, the memory system 10 may sends the host 20 a message FCRDY indicating that it is ready. This procedure may be performed every time before burst data is transmitted.

The memory system 10 checks the (N–1)-th burst data for an error (S215). If it is assumed that no error is detected (e.g., CRC errors and frame errors) in the (N–1)-th burst data, the memory system 10 sends a status message STAT to the host 20 (S220). As previously noted, the status message STAT may include an error flag indicating the presence or non-presence of an error in received data. Upon receiving the status message STAT, the host 20 transmits the next burst data, i.e., N-th burst data to the memory system 10 (S230).

The memory system 10 checks the N-th burst data for an error (S235). Again, it is assumed that no errors (e.g., CRC errors and frame errors) occur in the N-th burst data. However, the memory system 10 determines to request re-transmission of the N-th burst data in order to avoid busy time-out and thus sends the host 20 a status message STAT including an error flag indicating the existence of an error (S240). In response to the status message STAT, the host 20 retransmits the N-th burst data to the memory system 10 (S250).

The memory system 10 checks the retransmitted N-th burst data for an error (S255). It is also assumed that no errors (e.g., CRC errors and frame errors) occur in the retransmitted N-th burst data. The memory system 10 determines not to request data re-transmission in operation and thus sends the host 20 a status message STAT including an error flag indicating the no error (S260). Upon receiving the status message STAT, the host 20 transmits the next burst data, i.e., (N+1)-th burst data to the memory system 10 (S270).

Figure 10C:
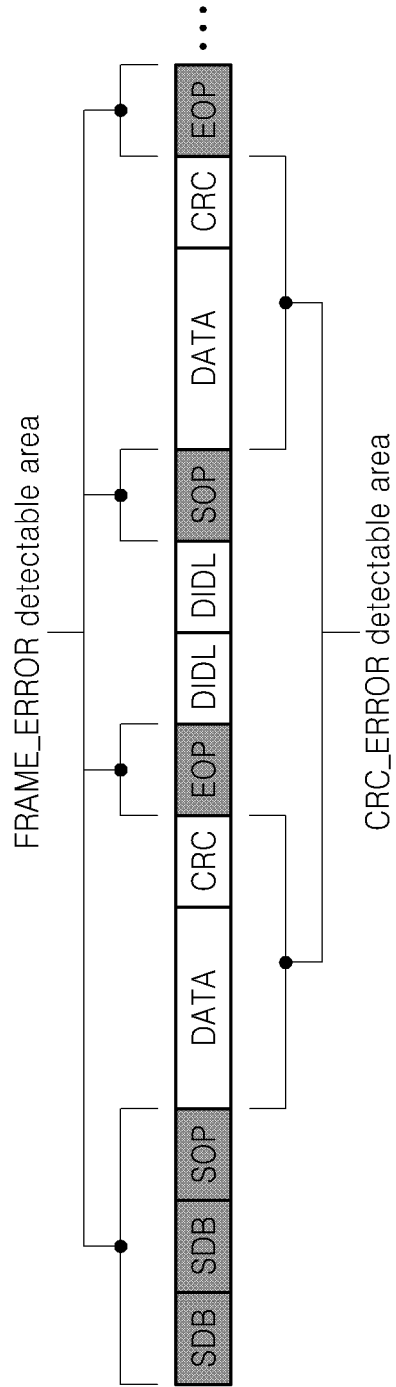
FIG. 10C is a conceptual diagram illustrating one possible structure for burst data according to some embodiments of the inventive concept.

FIG. 10C is a conceptual diagram illustrating one possible example of burst data according to certain embodiments of the inventive concept. Referring to FIG. 10C, the burst data may include a user data area DATA, a signal area CRC for CRC error detection, signal areas SDB, SOP and EOP for frame error detection, and other areas DIDL. In certain embodiments of the inventive concept, re-transmission may be determined for each burst data.

As described above, according to certain embodiments of the inventive concept, even when an actual error has not been detected in the received data, a phantom error (e.g., some form of recoverable error) may be intentionally generated in order to provoke an re-transmission of the current data (e.g., an extending re-transmission operation). Accordingly, a memory system according to certain embodiments of the inventive concept may effectively secure the timing margin required to execute internal operation(s) necessary to the proper processing of data in a non-volatile memory system. Such additional timing margin may be secured by the request of one or more extending re-transmission operations. The more re-transmission operations requested, the greater the additional timing margin. However, a maximum number of re-transmissions may be defined in accordance with system performance, environmental and/or channel conditions.

Available data processing margin will now be compared between when re-transmission is requested and when re-transmission is not requested in a case where no errors have occurred in the N-th burst data with reference to FIG. 10B.

When no errors occur in the N-th burst data and re-transmission of the N-th burst data is not requested, it is assumed that available time for processing the N-th burst data is a maximum of 500 ms. When re-transmission of the N-th burst data is requested once although no errors have occurred in the N-th burst data, available time for processing the N-th burst data is a minimum of (500 ms+500 ms). In other words, a busy time of 1 sec+$\alpha$ (where $\alpha$ is 0 or a real number greater than 0) is secured for the N-th burst data. The value of "$\alpha$" is proportional to a time taken to transmit the N-th burst data in a channel and is related with an operating frequency and is thus variable. Even if variable parameters are eliminated, the memory system can readily secure twice as much (e.g., a maximum of 1 sec) busy time for execution of a particular data processing operation.

When the maximum re-transmission request count is set to 3, for example, the busy period obtained by the memory system according to embodiments of the inventive concept may be up to four times greater than that typically available when only host-defined busy periods are used.

When sufficient processing time is secured for data as in the embodiments of the inventive concept, firmware overhead associated with avoiding busy period time-outs, as is conventionally typical, may be eliminated, and management of firmware becomes a great deal more flexible. Consequently, the overall performance of memory systems consistent with embodiments of the inventive concept may be increased.

FIG. 11 is a flowchart summarizing an operating method for a memory controller according to embodiments of the inventive concept. Referring to FIG. 11, the memory controller first receives a request from a host (S310). The request from the host 20 may be, for example, a write operation. Accordingly, the memory controller receives data (e.g., burst data) from the host (S320).

Before or while performing the write operation requested by the host, the memory controller determines whether an internal operation is necessary (S330). When it is determined that the internal operation is not necessary (S330=NO), the memory controller performs the requested write operation (S360).

In contrast, when it is determined that the internal operation (e.g., a merge operation, performance adjustment operation, or memory cell wear-levelling operation) is necessary for the management of a non-volatile memory device (S330=YES), the memory controller issues one or more extending retransmission requests to the host (S340) and accordingly reports a corresponding (recoverable) error in the received data. That is, the one or more re-transmission request may be carried out by sending a recoverable error message to the host.

The host then retransmits the data to the non-volatile memory device in response to the error message received from the memory controller. Then, the memory controller ignores or discards the retransmitted data while performing the internal operation (S350). After completing the internal operation, the memory controller may resume normal read/write operations as indicated by the host (S360).

Several exemplary internal operations have been suggested above, but those skilled in the art will recognize that other types of internal or housekeeping operations may be performed for the effective management of the non-volatile memory device. However, the noted merge operation essentially gathers data scattered around flash memory and consolidates it within a single block, thereby creating additional free blocks for data storage.

Since flash memory (e.g., NAND flash memory) cannot be directly overwritten, a memory block may be temporarily allocated to record data when data recording (or update) is necessary. In other words, a memory block (hereinafter, referred to as a log block) temporarily allocated for data update may be used in the flash memory.

However, log blocks cannot be limitlessly allocated and only limited number of log blocks can be used. When all log blocks are used up, data in a log block is compared with data in a data block and information (i.e., valid data) that has not been changed in the data block is merged with updated data (i.e., valid data) in the log block in a single block in order to empty the log block. This procedure is an example of the merge. The merge may be divided into different types of merge, such as simple merge, copy merge, and swap merge, according to a method of merging data in a data block with data in a log block.

Wear levelling is an operation designed to essentially change the physical position of physical blocks in relation to logic blocks mapped onto the flash memory. That is, a memory controller may be programmed to avoid the frequent erasing and writing of the same memory cells to extend the lifespan of the constituent memory cell array. The memory controller using wear-levelling programming techniques performs an operation on writable regions so that data file storage regions are uniformly distributed throughout an entire storage area in the flash memory.

According to one wear levelling technique, when an external request to write a predetermine data file is received, erase count information regarding every physical block is scanned sequentially or in predetermined order, and when a block in which data included in the data file will be stored has reached a predetermined maximum erase count, a physical position at which the data is stored is changed to a physical position of a block having a less erase count based on the scanned information.

When a merge operation or a wear levelling operation is performed, mapping information between a physical block and a logic block may be changed. In other words, the merge or the wear levelling operations may be accompanied by changes in a mapping table.

Performance adjustment may include an operation of gathering discontinuously scattered or fragmented pages.

Figure 12:
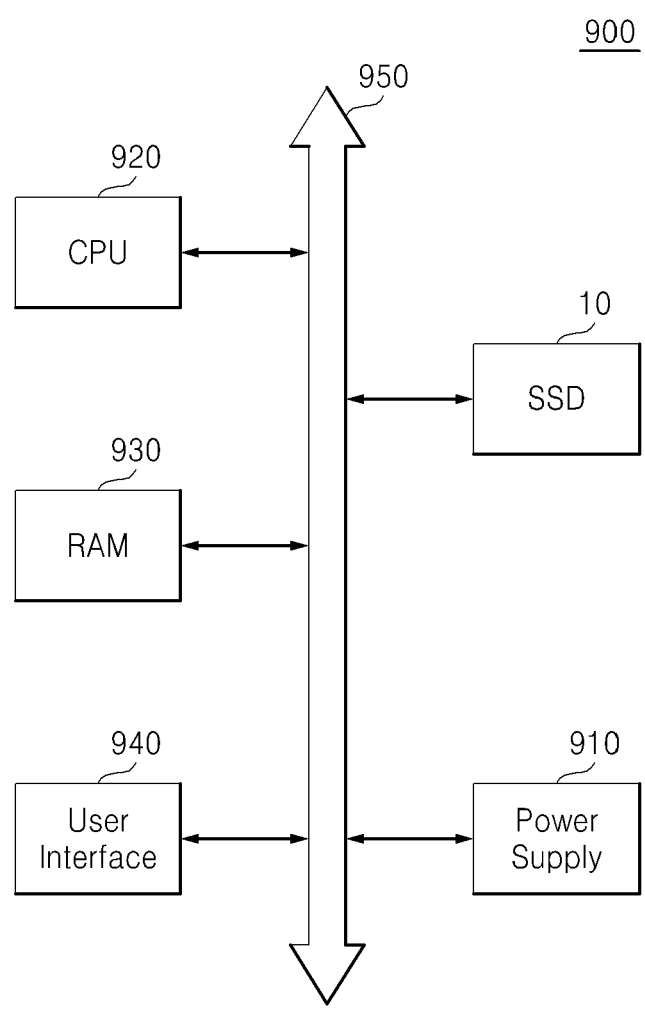
FIGS. 12 and 13 are block diagrams of respective electronic systems according to embodiments of the inventive concept.
Figure 13:
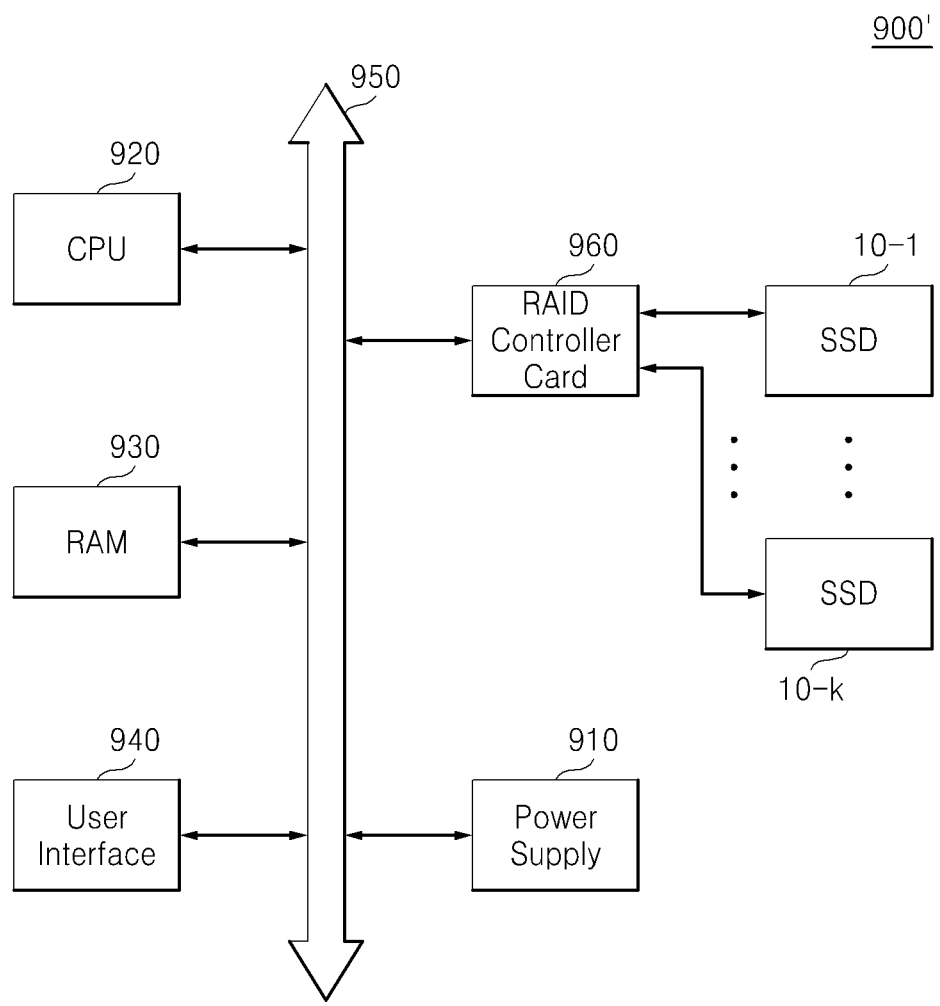

FIGS. 12 and 13 are block diagrams of respective electronic systems consistent with embodiments of the inventive concept.

Referring to FIG. 12, a electronic system 900 includes the memory system 10, as described above. The electronic system 900 also includes; a power supply 910, a central processing unit (CPU) 920, a RAM 930, a user interface 940, and a system bus 950 electrically connecting these elements.

The CPU 920 controls the overall operation of the electronic system 900. The RAM 930 stores information needed for the operation of the electronic system 900. The user interface 940 provides an interface between the electronic system 900 and a user. The power supply 910 supplies electric power to the internal constituent elements such as the CPU 920, the RAM 930, the user interface 940, and the memory system 10.

The CPU 920 may correspond to the host, and the memory system 10 may store or read data in response to a command from the host.

The electronic system 900' illustrated in FIG. 13 has a similar configuration as the electronic system 900 of FIG. 12, so only differences will be described to avoid undue repetition.

The electronic system 900' of in FIG. 13 further includes a RAID controller card 960. The memory system 10 does not interface with the host directly. The memory system 10 is installed into the RAID controller card 960 and communicates with the host via the RAID controller card 960.

The electronic systems 900 and 900' illustrated in FIGS. 12 and 13 may be a computer, a PDA (personal digital assistance), a cellular telephone, a smart phone, a MP3 player, a PMP (portable multimedia player), an automotive navigation system, or a MID (Mobile Internet Device). However, the present inventive concept is not restricted thereto.

FIG. 14 is a block diagram of a computer system 1000 including the memory system 10 described above. The computer system 1000 includes a CPU (central processing unit) 1110, an AGP (accelerated graphics port) device 1120, a main memory 1130, the memory system 10, a keyboard controller 1160, a printer controller 1170, and a south bridge 1180.

The computer system 1000 may be a PC (personal computer) system or a notebook computer in which the memory system 10 is used as a main storage device instead of hard disk drive. However, the present inventive concept is not restricted thereto.

In the computer system 1000, the CPU 1110, the AGP device 1120, the main memory 1130, and the like are connected to the south bridge 1180, and the SSD 10, a keyboard controller 1160, a printer controller 1170, and all sorts of peripheral devices may be also connected to the south bridge 1180.

Although it is not shown in FIG. 13, the computer system 1000 may further include a north bridge. In this case, the CPU 1110, the AGP device 1120, the main memory 1130, and the like may be connected to the north bridge (not shown).

The north bridge is an integrated circuit which is located at a side of CPU socket on the basis of center of a main board. Conventionally, the north bridge means a system controller including a host interface connected with the CPU 1110. The north bridge may be provided inside of the CPU 1110. The south bridge 1180 is an integrated circuit which is located at a side of PCI (peripheral component interconnect) slot on the basis of center of a main board. Conventionally, when a host bus is connected to other bus via a PCI bus, the south bridge 1180 acts a bridge for leading the host bus to the other bus.

The AGP is a bus standard for realizing a three dimensional (3D) graphic expression rapidly. The AGP device 1120 may include a video card and the like for playing monitor image. The main memory 1130 may be implemented by a Random Access Memory (RAM) which is a volatile memory, but is not restricted thereto.

In the computer system 1000, the memory system 10 is connected to the south bridge 1180, but is not restricted thereto. The memory system 10 may be connected to the north bridge or directly connected to the CPU 1110.

The inventive concept may be variously embodied, in part or in whole, as computer-readable codes store on one or more computer-readable medium. The computer-readable recording medium may be any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices.

As described above, according to certain embodiments of the inventive concept, even when no error has actually been detected (or does not occur) in data received from a host, a memory system consistent with embodiments of the inventive concept may nonetheless indicate a recoverable error in order to intentionally provoke what has been termed an extending re-transmission—a data re-transmission that is not required by an EEC function, but instead is desired as a way of extending a busy period for the memory system during which it may perform certain internal operations. As a result, busy period time-outs that may conventionally occur are prevented, and the overall performance of a memory system is increased.

While the inventive concept has been particularly shown and described with reference to exemplary embodiments thereof, it will be understood by those of ordinary skill in the art that various changes in forms and details may be made therein without departing from the scope of the inventive concept as defined by the following claims.

What is claimed is:

1. A memory controller that controls a non-volatile memory device, the memory controller comprising:
   a central processing unit that provides a re-transmission control signal;
   an error check block that determines whether an error exists in data received from a host and generates a corresponding error check signal; and
   a re-transmission request unit receiving the control signal and the error check signal, configured to communicate a request to the host for an error-correcting re-transmission operation when it is determined that an error exists in the received data as indicated by the error check signal, and further configured to communicate to the host a request for an extending re-transmission operation when it has been determined that an error does not exist in the received data and in response to the re-transmission control signal.

2. The memory controller of claim 1, wherein the central processing unit defines the re-transmission control signal to communicate the extending re-transmission operation when the memory controller performs an internal operation for the non-volatile memory device.

3. The memory controller of claim 2, further comprising:
   a register configured to store a maximum re-transmission request count; and
   a counter configured to count a number of sequential re-transmission requests communicated by the re-transmission request unit,
   wherein the central processing unit determines for each request of an error-correcting re-transmission operation and each request for an extending re-transmission operation whether the number of sequential re-transmission requests, as counted by the counter, exceeds the maximum re-transmission request count.

4. The memory controller of claim 2, further comprising:
   a buffer memory configured to temporarily store the received data,
   wherein upon a determination by the error check block that an error does not exist in the received data, the central processing unit stores the received data in the buffer memory.

5. The memory controller of claim 4, wherein after storing the received data in the buffer memory, and upon a determination by the re-transmission request unit to request an extending re-transmission operation, the memory controller again receives the data from the host and thereafter discards the again received data before storing the again received data in the buffer memory.

6. The memory controller of claim 4, wherein after the received data is temporarily stored in the buffer memory, the central processing unit stores the received data in the non-volatile memory device.

7. The memory controller of claim 4, controller further comprising:
   a physical interface block configured to receive the data from the host, to communicate the request for the error-correcting re-transmission operation to the host, and to communicate the request for the extending re-transmission operation,
   wherein the re-transmission request unit comprises:
      a first selector providing a first output signal controlling the physical interface block in response to a first re-transmission control signal provided by the central processing unit; and
      a second selector providing a second output signal controlling the memory buffer in response to a second re-transmission control signal provided by the central processing unit.

8. The memory controller of claim 7, wherein the first selector and the second selector each receive the error check signal as an input.

9. The memory controller of claim 8, wherein the first re-transmission control signal controls the request for the extending re-transmission operation when the error check signal indicates that an error does not exist in the received data.

10. The memory controller of claim 8, wherein the second re-transmission control signal controls the storing of the received data in the buffer memory when the error check signal indicates that an error does not exist in the received data.

11. The memory controller of claim 4, controller further comprising:
   a physical interface block configured to receive the data from the host, to communicate the request for the error-correcting re-transmission operation to the host, and to communicate the request for the extending re-transmission operation,
   wherein the re-transmission request unit comprises:
      a first selector providing a first output signal controlling the physical interface block in response to a first re-transmission control signal provided by the central processing unit;
      a second selector providing either the received data or null data to the error check block in response to a dummy data signal provided by the central processing unit; and
      a third selector providing an indication to the first selector whether an error exists in the received data in response to the dummy data signal.

12. The memory controller of claim 11, wherein the first selector and the third selector each receive the error check signal as an input.

13. The memory controller of claim 12, wherein the first re-transmission control signal controls the request for the extending re-transmission operation when the error check signal indicates that an error does not exist in the received data.

14. The memory controller of claim 12, wherein the dummy data signal controls whether the received data is passed to the error check block and the memory buffer.

15. The memory controller of claim 1, wherein each one of the requests to the host for the error-correcting re-transmission operation and for the extending re-transmission operation is communicated by a status message sent from the memory controller to the host.

16. A method of operating a memory controller that controls a non-volatile memory device, the method comprising:
- receiving data from a host and determining whether or not the received data includes an error;
- upon determining that the received data includes an error, requesting an error-correcting re-transmission operation for the received data; and
- before performing an internal operation by the non-volatile memory, requesting an extending re-transmission operation for the received data after determining that the received data does not include an error and after storing the received data in a memory buffer.

17. The method of claim 16, wherein the memory controller causes the internal operation to be performed in the non-volatile memory during a time period in which the host is performing the extending re-transmission operation.

18. The method of claim 16, further comprising:
- reporting to the host the error occurrence in the received data in conjunction with requesting the error-correcting re-transmission operation for the received data.

19. The method of claim 16, further comprising:
- reporting to the host a phantom error in conjunction with requesting the extending re-transmission operation for the received data.

20. The method of claim 16, wherein requesting the extending re-transmission operation for the received data includes requesting multiple, sequential extending re-transmission operations for the received data; and
- counting the multiple, sequential extending re-transmission operations in view of a maximum number of extending re-transmission operations.

\* \* \* \* \*